United States Patent [19]
O'Donnell

[11] Patent Number: 5,014,712
[45] Date of Patent: May 14, 1991

[54] CODED EXCITATION FOR TRANSMISSION DYNAMIC FOCUSING OF VIBRATORY ENERGY BEAM

[75] Inventor: Matthew O'Donnell, Schenectady, N.Y.

[73] Assignee: General Electric Company, Schenectady, N.Y.

[21] Appl. No.: 457,134

[22] Filed: Dec. 26, 1989

[51] Int. Cl.⁵ .................. A61B 8/00; G01N 29/00
[52] U.S. Cl. .................. 128/661.01; 73/625; 73/626; 367/103; 367/105
[58] Field of Search ................ 128/661.01; 73/625, 73/626; 310/334, 333; 367/103, 105

[56] References Cited

U.S. PATENT DOCUMENTS

| 4,351,038 | 9/1982 | Alais | 73/626 X |
| 4,395,912 | 8/1983 | Hassler | 73/626 |
| 4,534,221 | 8/1985 | Fife et al. | 73/625 X |
| 4,569,231 | 2/1986 | Carnes et al. | 73/626 |
| 4,788,981 | 12/1988 | Nagasaki et al. | 73/626 X |
| 4,870,971 | 10/1989 | Russell et al. | 128/661.01 |

Primary Examiner—Francis Jaworski
Attorney, Agent, or Firm—Marvin Snyder; James C. Davis, Jr.

[57] ABSTRACT

A method for imaging a sample with a beam of vibratory energy from an array of transducers excites the array with successive ones of a plurality M of coded excitation signal sets with each set occurring in a different one of successive excitation time intervals. Each different set has signals with a different code. An excitation beam, produced by the array, is focused into the sample at successively smaller distances, along a selected ray path from the array, during each successive excitation time interval. A reception beam is focused along the ray path at successively greater distances from a minimum distance away from the array during each successive one of a like plurality of reception time intervals, for receiving, during each reception time interval, return response signals reflected from the sample. The received signals are processed and all channels are coherently summed prior to cross-correlating the summed signals with reference signals derived from the coded signals of the set used for the associated excitation time interval, to recover a response signal substantially only from a volume of the sample at that distance associated with each time interval. Apparatus for implementing this method is disclosed.

20 Claims, 3 Drawing Sheets

CODED EXCITATION FOR TRANSMISSION DYNAMIC FOCUSING OF VIBRATORY ENERGY BEAM

BACKGROUND OF THE INVENTION

The present invention relates to vibratory-energy-beam imaging and more particularly, to a novel method and apparatus for increasing the resolution and/or signal-to-noise ratio of a vibratory energy beam, and particularly a medical ultrasonic imaging system beam, by utilization of dynamic focusing and coded excitation techniques during beam transmission.

Beamed vibratory energy imaging systems, such as medical ultrasound imaging systems and the like, routinely enhance the spatial resolution of pulse-echo images by dynamically focusing the signals received by a phased array transducer into a narrow beam. The time-dependent delay provided in each receiver channel phases the receive signals into a beam focused at some range R, and some angle $\theta$, with respect to the transducer array normal. However, the ultimate resolution of pulse-echo images is determined not by the receiver beam pattern alone, but rather by the product of the receiver beam pattern with the transmitter beam pattern. Thus, dynamic reception focusing, while greatly increasing pulse-echo image resolution (especially in the near field), leaves much to be desired with resolution at greater field distances. During transmission, since the array transducers have hitherto been excited with an impulse driving function on transmit, the conventional system transmit beam has only been focused (by a mechanical lens configuration or a fixed time delay sequence) at a single range, i.e. in a single focal zone. Consequently, outside this transmitter fixed focal zone, the resolution of the image is severely limited by the characteristics of the transmitted beam, even though the imaging system resolution was very good within that transmitter focal zone. Thus, even though the receiver provides an in-focus beam in regions outside of the transmitter focal zone, the imaging system resolution is still degraded. Therefore, to obtain high resolution in the entire image plane, it is desirable to increase resolution by dynamically-focusing the transmission beam so that both the transmit and receive beams are focused at the various ranges along each radial of a scanned sector. Because each transmitted beam, even though focused in an associated zone, provides some excitation of other zones of a sample-to-be-imaged, some means must be provided to reject responses from outside that focal zone.

BRIEF SUMMARY OF THE INVENTION

In accordance with the invention, a method for imaging a sample with a beam of vibratory energy from an array of a plurality N of transducers, includes the steps of: exciting the array with successive ones of a plurality M of coded excitation signal sets, each set being provided in a different one of a like number M of successive excitation time intervals and each different set having signals with a different one of a like plurality M of codes; focusing an excitation beam, produced by the array, into the sample at a successively smaller distance $R_i$, where $1 \leq i \leq M$, along a selected ray path from the array during each successive i-th one of the M excitation time intervals; then focusing a reception beam produced by the array along the ray path and at a successively greater distance $R_{M-i}$ from a minimum distance, away from the array during each successive i-th one of a like plurality M of reception time intervals; receiving, during each reception time interval, return response signals reflected from the sample; processing the received signals from each array transducer in a separate channel; coherently summing all of the channel processed signals; and cross-correlating the summed signals with a reference signal derived from the coded signals of the set used for the associated i-th excitation time interval, to recover a response signal substantially only from a volume of the sample at that distance $R_i$ associated with each i-th time interval. The response signal in the neighborhood of distance $R_i$ will exhibit increased signal-to-noise ratio and resolution.

In a presently preferred embodiment, the codes are serial multi-bit binary patterns and are codes which are substantially orthogonal to one another (such as Golay codes and the like). Focusing, during transmit and receive, is done by time-delay beam formation. Apparatus for achieving the foregoing benefits, in accordance with the inventive method, is disclosed.

Accordingly, it is an object of the present invention to provide a vibratory energy imaging method and apparatus for increasing at least one of signal-to-noise ratio and spatial resolution of a resulting image.

This and other objects of the present invention will become apparent upon a reading of the following detailed description, when considered in conjunction with the associated drawings.

DETAILED DESCRIPTION OF THE INVENTION

Figure 1:
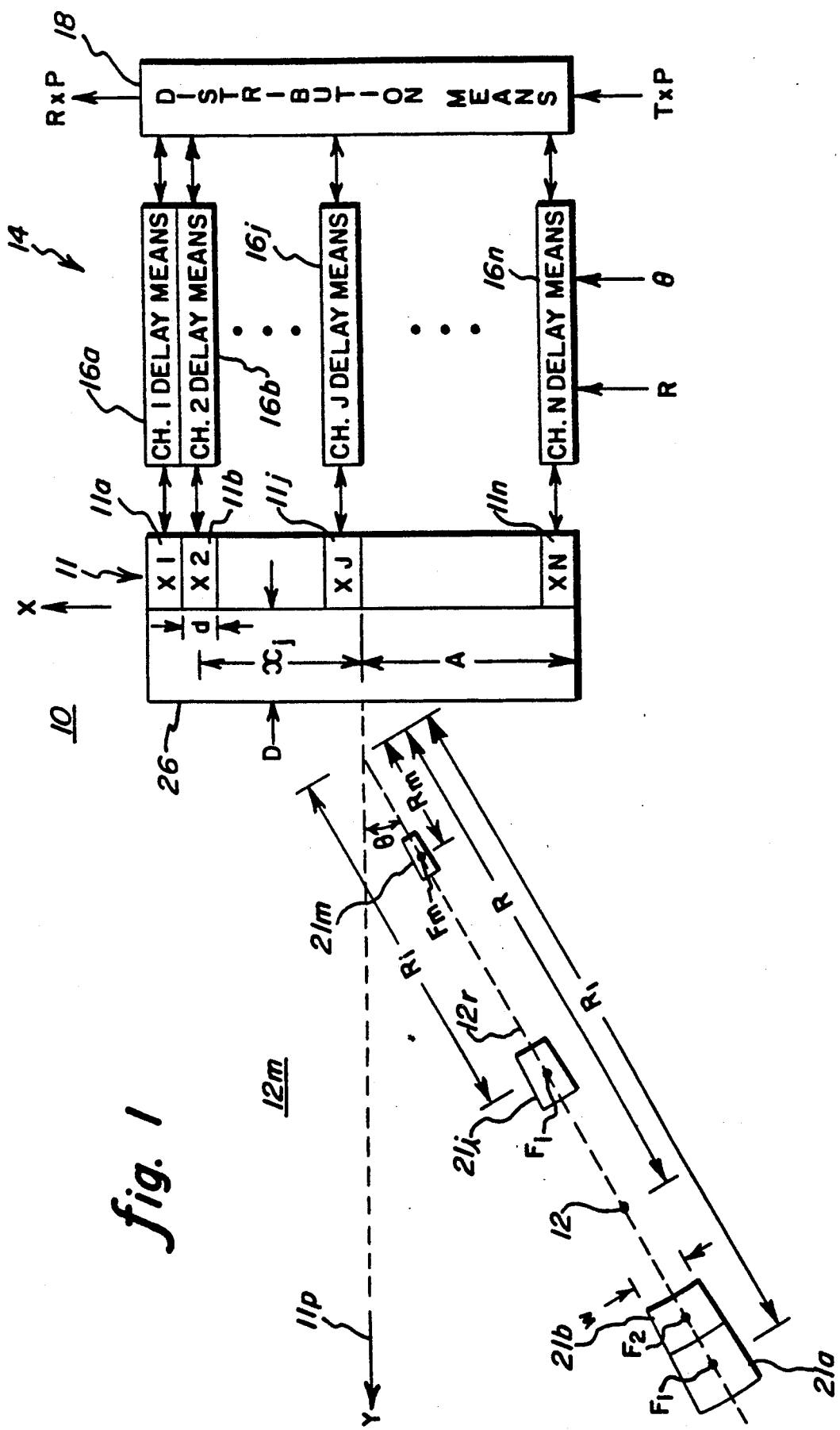
FIG. 1 is a schematic block diagram of a portion of a beam imaging system and of the environment in which it operates.

Referring initially to FIG. 1, a portion of a vibratory energy imaging system 10, such as a medical ultrasound imaging system and the like, is shown. In system 10, a phased transducer array 11 is formed of a plurality N (e.g. N=64) of individual transducers $11a$–$11n$. The array forms a beam of transmitted energy which is utilized to illuminate (e.g. to insonify, if ultrasound energy is used) a sample medium $12m$; the beam is partially focused, in the X-Y plane, at a range R along a radial line $12r$, which is positioned at an angle $\theta$ with respect to a perpendicular $11p$ to a planar face of transducer array 11. As is well known, the transmitted beam exits from transducer 11 along radial line $12r$ due to the establishment of angle $\theta$ by providing to each j-th one, where $1 \leq j \leq N$, of the array transducers $11j$ an excitation pulse signal at a slightly different time $\Delta t_j$, with respect to the time at which a transmit-beam pulse signal TxP is provided. The individual time delay in each channel (where a channel is defined as the apparatus associated with each different transducer $X_j$, for providing a separate insonification signal therefrom on transmission, and for providing a separate processed signal therefrom on reception) is provided by action of a beam-forming means 14. Means 14 has a plurality N of individual channel delay means 16a-16n each providing a separate channel time delay $\Delta t_j$, during excitation, to an associated one of the plurality N of essentially simultaneous pulses provided by a distribution means 18, responsive to a single transmission synchronization pulse TxP. The channel transmit time delays $\Delta t_j$ are determined by the channel number j and by the range R and angle $\theta$ information applied to all of the delay means 16a-16n. Heretofore, either a mechanical lens (not shown) positioned in front of transducer array 11 or a fixed pulse and time delay sequence provided a fixed focus distance $R_f$ to the transmission beam, at any particular angle $\theta$. Thus, the depth $R_f$ at which the beam was focused, on transmission, was an average depth, and provided a compromise of all the possible depths between a minimum focal length $F_m$ at a minimum depth/range $R_m$, and a maximum focal length $F_1$ at a maximum depth/range $R_1$. For a typical medical ultrasound imaging unit, R may be 5-200 mm. and $\theta$ may change in increments of about 0.7°, for a sector scanner which uses 128 beams to cover a sector of about 90°.

In accordance with the present invention, a plurality M (e.g. M=8) of separate, sequential beam portions are provided at each angular orientation $\theta$, with each separate transmission beam portion being individually focused at a different successive one of focal ranges $R_i$, where $R_m \leq R_i \leq R_1$, by action of beam-former means 14. Each different focused beam portion is distinguished from all other beam portions focused along the same beam heading $\theta$, by modulating that beam portion with a particular coded sequence unique to that focal range $R_i$. Thus, all of the N transducers in the array 11 are excited, during each different focal zone excitation time interval, with a sequence of L (e.g. L=512 bits) sequential coded-signal pulses. Upon initiation of a new pulsing sequence (i.e. start of a new beam), a single transmit synchronization pulse TxP is distributed through distribution means 18 simultaneously to the right-hand input of each of the individual channel delay means 16a-16n. Each code pulse, derived from the pulse code means associated with the delay means of that channel, is individually delayed in each channel, by the delay $\Delta t_j$ necessary for that j-th channel and is dependent upon the angle $\theta$ and the focal range $R_i$ of the zone 21 at which the beam is then to be focused. The focal range $R_i$ starts at a maximum range $R_1$, with a focal length $F_1$ in a farthest zone 21a, in a first insonification time interval, and using a first coded signal set; the focal range decreases in steps, until a minimum range $R_m$, with a focal length $F_m$ in a nearest zone 21m, is reached in an m-th time interval and using a m-th coded signal set. In normal operation, the coded pulse signal associated with each focal length is identical in each channel, where differences in focal characteristics are determined solely by time delay differences between channels. However, unique pulse code sequences can be generated in each channel, to further isolate different focal zones.

Figure 2A:
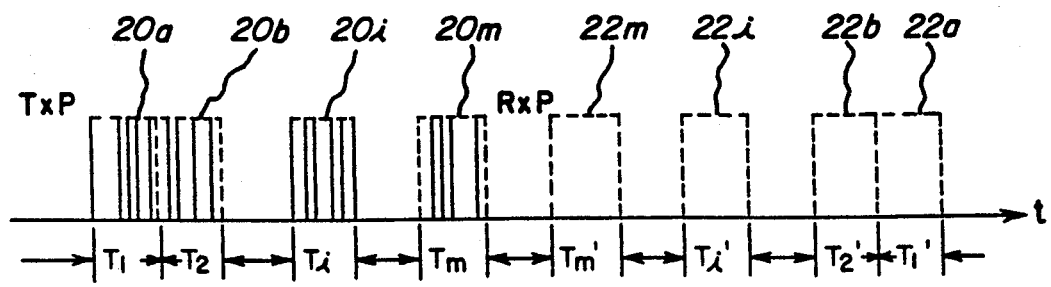
FIG. 2a is a graph illustrating the time sequence of coded excitation transmission pulses and time intervals during which corresponding echoes are received during a following reception sequence.

Referring now to FIGS. 1 and 2a, at the start of a transmission sequence to produce M beam portions all at angle $\theta$, a first transmission excitation pulse TxP is provided in a first time interval $T_1$. In accordance with the invention, each TxP pulse is modulated with a uniquely-coded sequence 20a of pulses. In the particular embodiment here, the same sequence is used in all channel delay means 16a-16n. Here, a binary-amplitude set of codes is used; multi-level codes can also be used.

The channel delay $\Delta t_j$ introduced by the j-th delay means $16_j$ is given by $$\Delta t_j = (-x_j/v) \sin \theta + (x_j^2/2Rv) \cos^2 \theta$$

where v is the velocity of sound in the medium 12m, and $x_j$ is the distance from the center of the array to the center of the particular j-th element for which the time delay is being calculated, for all transducers $1 \leq j \leq n$. The first term is a static (i.e. range independent) steering term while the second term is the dynamic focusing term, and will be well known to those skilled in the art by reference to reception steering and dynamic reception focusing useage.

In the first time interval $T_1$, the uniquely coded transmission excitation pulsed signal 20a is used to excite (via driver means well known to the art) the channel transducers and causes the array to send out a beam portion of energy that is focused at furthest distance $R_1$, substantially at focal point $F_1$, and thus excites echoes from any reflectors within a first zone 21a. Upon cessation of the first excitation beam portion, a second excitation beam portion is formed, in time interval $T_2$, by the use of a second uniquely-coded transmission excitation pulsed signal 20b. The second beam portion is sent out at the same angle $\theta$ but the channel time delays $\Delta t_j$ are changed to focus this portion at a new range $R_2$, forming an excitation zone 21b about a second focal point $F_2$, at a slightly shorter range than the first focal point $F_1$. Sequentially shorter focal ranges are utilized for subsequent pulses, with an i-th signal (with its uniquely-coded sequence $20i$ of pulses) occurring in the i-th time interval $T_i$, to form a beam portion focused at a range $R_i$, so that the focal point $F_i$ is still along radial 12r, but is at a distance both slightly less than the distance at which the immediately-preceding coded-excitation beam portion was focused, and slightly greater the focal distance of the next-subsequent coded-excitation beam portion. Finally, the last, or m-th, coded beam portion (at that angle of orientation $\theta$) is transmitted, responsive to a j=M unique code, in time interval $T_m$, and with the signal transmission excitation signal 20m providing a beam portion focused at range $R_m$, in a zone 21m about a nearest focal point $F_m$. It will be seen that each of the focal zones 21a-21m has an angular width w which is substantially equal to the separation between beams (for sector scanner covering about 90° with $2^8=128$ beams, $\Delta\theta = 0.7° = w$). The distances between focal points $F_i$ may all be equal (i.e. may be the differential difference ($R_1-R_m$) divided by the number M of individually-coded different beam focal ranges) or may vary in accordance with some desired schedule (such as a hyperbolic distribution, and the like).

Figure 2B:
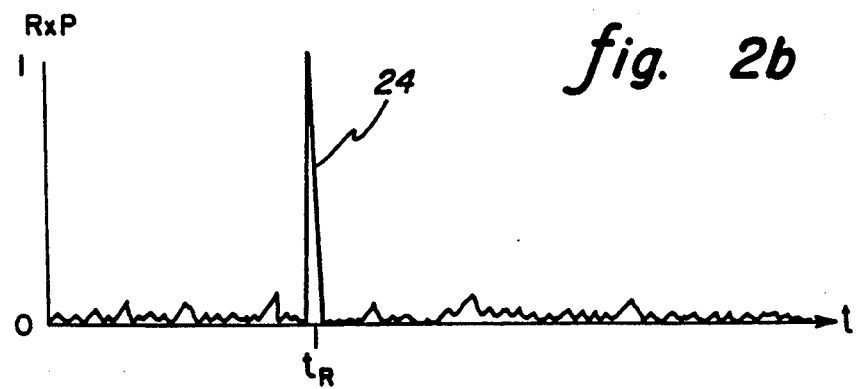
FIG. 2b is a graph illustrating the correlation of a coded reception signal and the pulse code representing the associated focus zone.

The zone sequence is reversed during reception. The last-transmitted beam 20m is focused in the nearest zone and results in a first-received reception beam portion 22m, during a first reception time interval $T_m'$, wherein the output of transducer array 11 is formed into a reception beam at the same angle $\theta$, and focused at the minimum range $R_m$, by the well known action of summing the output signals from each delay means 16a-16n for each individually-delayed one of the N channels. As will be discussed hereinbelow with respect to FIG. 3, the summed output of all of the N individually-delayed channels is then correlated with a reference signal derived from the unique code utilized for the associated transmission beam portion, to provide a correlated reception signal 24, as shown in FIG. 2b, which is provided only at a time $t_R$ corresponding to the range R of the response signal received from a sample portion in a particular focal zone F. Thus, during nearest zone reception time interval $T_m'$, the m-th code sequence is provided for correlation with the received summation signal; only the correlated results are retained for further processing, storage and/or display. The next focal zone response is received in a next time interval, during which the transducer outputs are individually channel-delayed to form a beam portion focused at the next-further zone; the summed processed signal is correlated with the code which was used to modulate the excitation signal focused in that zone. Thus, the i-th zone 21i is primarily responsible for a reflected signal received during an associated reception time interval $T'_i$ and the energy in received pulse signal 22i thereof is individually delayed in delay means 16, based upon the range $R_i$ of that pulse. The N channel outputs of means 16a–16n, each individually delayed, are acted upon by distribution means 18 to provide at least one coherently-summed received signal, for correlation with the uniquely-coded signal sequence used for transmission pulse signal 20i. Similarly, the remaining returns from successively further focal zones are received, processed and correlated. The next-to-last return signal 22b from zone 21b is received in time interval $T_2'$, prior to reception, in time interval $T'_1$, of the return signal 22a from the furthest focal zone 21a. The correlation of each uniquely-coded received signal portion 22i, for $1 \leq i \leq m$, with the code utilized for the corresponding transmission signal portion 20i will thus result in received energy signals $R_xP$ each having a peak 24 occurring only at the time $t_R$ associated with a range R at which a reflector 12 provides an echo signal, and, due to the dynamically-focused transmission beam, with a greater signal-to-noise ratio than would be provided with a fixed (non-dynamically) focused transmission scheme.

Recapitulating, dynamic focusing is achieved on transmission by changing the time delay during the duration of each uniquely-coded excitation beam portion time interval 20i, so that each differently coded pulsed beam portion is focused in an associated zone, at a different range of interest. On reception, the time-delayed outputs of the receiver channels are summed during each different reception portion time interval 22i to form a focused received beam signal, which is then correlated with a reference code derived from the excitation pulse code used for the corresponding zone, i.e. the reference input to the correlator for any given range is a code (at baseband rates) derived directly from the particular code associated with that range. It will be noted that the first input to the correlator is the last (or m-th) transmission code utilized, while the last correlator input is the first code. In order for an unambiguous correlation to occur, several system constraints must be met. First, the duration T of each individual coded transmission pulse signal 20 cannot exceed the time associated with the propagation delay between adjacent focal ranges $R_i$. Additionally, each of the codes should be orthogonal to all other codes (which condition can be met by utilizing Golay, and the like, orthogonal codes). The transducer array must also be offset, in the Y direction, by a depth D corresponding to the time T during which one code block 20 is propagating through the medium of an offset layer 26, so that the array is not simultaneously providing a transmission pulse and attempting to receive relevant response information. Delay medium 26 may be a small bag or other layer of a liquid; however, medium 26 may be removed if a first block 20a of coded excitation is ignored upon reception.

Figure 2C:
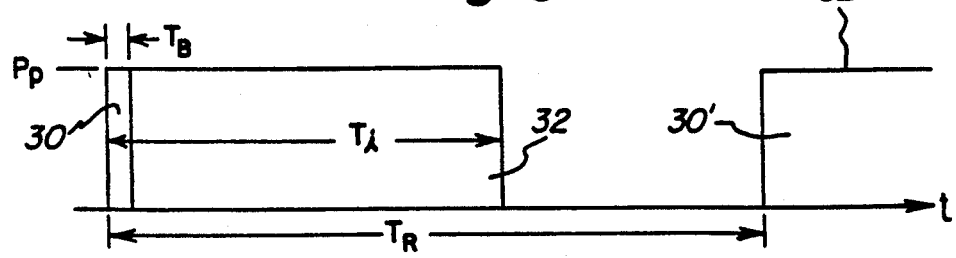
FIG. 2c is a graph illustrating the maximum pulse power applied to a sample volume.

Referring now to FIG. 2c, even greater signal-to-noise ratios can be achieved by raising the average power transmitted in each individually-coded beam portion pulse signal. In conventional imaging (i.e., the current state of the art) the major limitation on power delivery is peak power at the transmitter focus ($P_p$), not average power. Imaging using a single excitation pulse 30 does not operate with optimal average power, and thus works at reduced signal-to-noise ratio. Additionally, because a single pulse is used for all depths, at ranges far from the transmitter focus the signal-to-noise ratio is reduced due to beam spread. In the present invention, the i-th coded signal is applied to the transducer at peak power $P_p$ for time $T_i$ interval 32. In so doing, the average power is increased by the ratio of $T_i$ to $T_B$. Since time interval $T_B$ is determined by the bandwidth of the transducer, the signal-to-noise (S/N) ratio improvement is $$S/N(dB)_i = 10 \log_{10}(BT_i),$$

where B is the bandwidth of the transducer. In addition, since each code is focused separately, there is no loss in signal-to-noise ratio throughout the entire image plane. As in conventional imaging, each array firing is repeated at a repetition time interval $T_R$. The peak power for the coded signal must be chosen to insure that the average power level, given by $$P_{av} = P_p(T_i/T_R),$$

does exceed accepted levels. With this constraint, coded signals should permit a 10–20 dB improvement in signal-to-noise ratio for normal ultrasound imaging applications.

Figure 3:
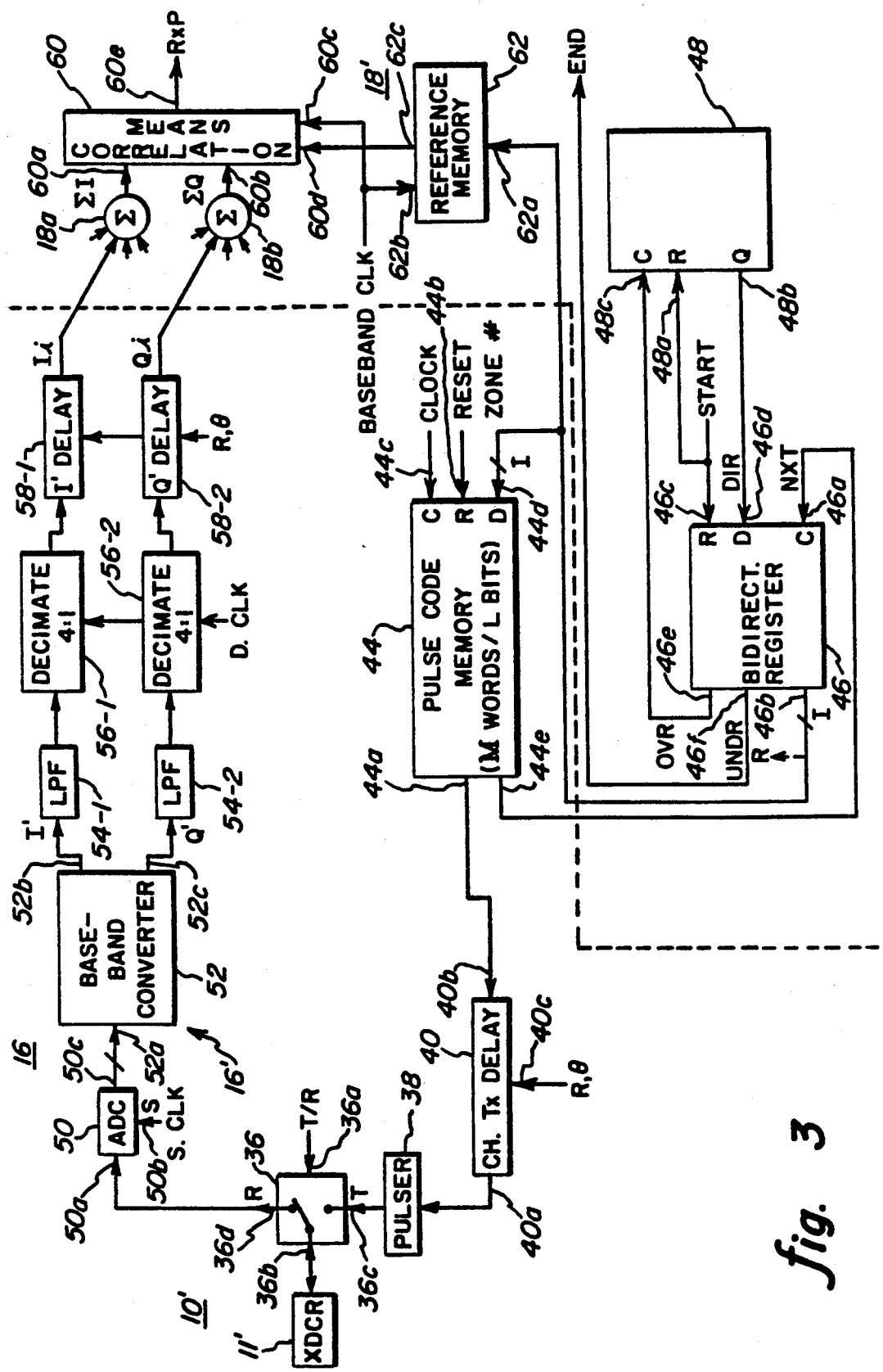
FIG. 3 is a schematic block diagram of a portion of the electronics for a single channel, for reception focusing and for dynamic focusing on transmission utilizing coded excitation.

Referring now to FIG. 3, a schematic block diagram of a portion 10' of the electronics is shown for a single one of the N channels of an imaging apparatus with dynamically-focused reception and transmission. Each channel transducer 11' is interconnected with a channel transmit/receive (T/R) means 36, which receives a T/R control signal at a first input 36a, to determine if a common port 36b is connected either to a transmit T port 36c or to a receive R port 36d. During transmission time intervals, when the transducer is connected to the transmit T port 36c, the output of a transmission pulser means 38 provides an electric signal to transducer 11', for causing the transducer to provide the excitation energy in the desired form (e.g. ultrasonic energy in an ultrasonic imaging system). The characteristics of the transducer-energizing pulse signal provided by pulser 38 are determined by the signal at an output 40a of a channel transmission TX delay means 40. Output 40a is energized responsive to the energization of a TxP input 40b thereof, but subject to a time delay dependent upon range R and angle $\theta$ information provided at an auxiliary input 40c. The coded transmit channel pulse at input 40b is obtained from the output 44a of a channel pulse code memory means 44, which stores the plurality M of digital data words, each of L bits in length; each channel in my presently preferred embodiment has its own code memory means 44 (although a single, common memory means could be used, with its output code supplied in parallel to all N channels). The L bits of each word are read from output 44a in serial fashion, responsive to a clock signal provided at a clock input 44c. Memory means 44 also receives a reset signal at a reset R input 44b and receives a plurality I of bits of zone number information at a zone data D input 44d. After each L-bit pulse code serial digital signal is sent, a second output 44e is pulsed. This second output 44e sends a "next-count" (NXT) signal to a clock C input 46a of a bidirectional counter means 46, which provides the I-bit-parallel zone number data output (as well as the zone/range R information) at a first output 46b thereof. A reset R input 46c of the register receives a sequence START signal, as does a reset R input 48a of a flip-flop means 48. A direction-steering D input 46d receives a direction-setting DIR signal from a Q output 48b of the flip-flop means 48. The flip-flop means clock input 48c is provided by an overflow OVR output 46e of the bidirectional register, which also provides an underflow UNDR output 46f to signify the end of each coded, dynamically-focused excitation/reception sequence.

In the received signal portion of each channel, after any time-gain control (TGC) and the like, the received R signal from T/R means port 36d is digitized in a channel analog-to-digital converter (ADC) means 50. Thus, the receive R signal is applied to an analog input 50a and a sampling clock (S.CLK) signal as provided to a sample S input 50b, so that a multiple-bit-parallel digital data word, representative of the amplitude at input 50a when the sampling signal appears at input 50b, is provided at a digital output port 50c. The channel digital data word is provided to the channel delay means 16', at the input 52a of a baseband converter means 52. The converter means provides a baseband in-phase signal I' at a first output 52b and provides a baseband quadrature-phase Q' signal at a second output 52c. Each of the baseband signals I' and Q' are low-pass filtered, in a respective one of filter means 54-1 and 54-2, and are then decimated (e.g. by a 4:1 decimation ratio, for 5 MHz. ultrasonic signals sampled at S=20 MHz.) responsive to a decimation clock (D.CLK) signal, in respective decimation means 56-1 or 56-2. The decimated I' and Q' signals are then each separately delayed by the time delay $\Delta t_j$ for that particular j-th channel, determined by receipt of the zone/range R and as azimuth $\theta$ information, in respective delay means 58-1 and 58-2, to provide the respective i-th channel in-phase output signal $I_i$ and i-th channel quadrature-phase output signal $Q_i$. All channel output signals are fed to the common means 18' where the in-phase channel signals $I_i$ go to a first summation means 18a, providing a in-phase summed $\Sigma I$ signal to a first input 60a of a correlation means 60. Similarly, all channel quadrature-phase $Q_i$ signals are provided to a second summation means 18b, providing a quadrature-phase summed $\Sigma Q$ signal to a second input 60b of the correlation means. The correlation means also receives a baseband clock signal at a clock input 60c and a reference code signal, from a reference memory means 62, at a correlation code input 60d. An output 60e provides the correlated received signal RxP, for each zone, for use in other system portions (not shown). The reference code signal sequence, provided by memory means 62, is selected by the zone number data from register outputs 46b, and is a reduced set of the L-bits of each zone excitation code; the reduction in length and clock rate of the reference code is necessitated, in this embodiment, by conversion to baseband and/or decimation, of the received data. Thus, a reference code of R=128 words is used.

In operation, a START signal pulse is provided to all N channels, at the commencement of each sequence of M zonal excitations and M subsequent zonal receptions, (e.g. a START pulse occurs at the start of the first zone time interval $T_1$ in FIG. 2a). Flip-flop means 48 (in the common section 18, separate from all N channels) is reset, so that the Q output thereof is in a logic "zero" state, setting the counter direction (via input 46d) to count in an upward (increasing count) direction. Thus, the I bits of data at bidirectional counter outputs 46b are reset to a lowest count thereof. The zone number data is received at reference memory input 62a, to select the appropriate correlation reference data word for this focal zone. This first zone number count data also appears at memory input 44d and, along with the first L clock pulses received at input 44c, causes the pulse code memory output 44a to provide the L binary sequential bits of a first code word. This code sequence is provided to the channel transmission delay means 40, along with angle $\theta$ data (from a system computer means) and the R data indicative of the first (greatest) range, e.g. range $R_1$. After the proper delay is provided by means 40 in that channel to focus the array 11 output at first focal point $F_1$ (FIG. 1), the pulser means 38 in each channel is energized, causing the transducer 11' in each channel to provide that channel's portion of energy contribution to the array output for a focused excitation transmission of the further zone.

At the end of the first coded pulse sequence, auxiliary memory output 44e is pulsed, applying a clock pulse to the bidirectional register clock C input 46a, and causing the count at the data output 46b thereof to increase by one The second zone 21b is now to be insonified, with the array focused at second focal point $F_2$; the next L clock bits at input 44c cause the associated I-th one (where I=2 now) of the M different coded words to be sent from memory means output 44a. Thus, a completely different, second L-bit code word is provided at the input of the transmit delay means 40 of each channel, and each bit thereof is delayed by an amount $\Delta t_j$ dependent upon the channel number j, the angle $\theta$ data previously provided by the system computer, and the new zone/range R number provided at the output of counter 46. The delayed pulses of the second code word appear at the pulser means 38 of each channel at different times, and cause the channel transducer in each channel to provide the vibratory energy therefrom at a time established to provide a pulse-coded burst of vibratory energy which is directed at the required angle $\theta$ and focused at the required range (e g. range $R_2$) for that (second) zone. At the end of the second coded word output from memory 44, auxiliary output 44e is again pulsed, to advance the bidirectional counter to the next (third) count, thereby advancing the memory means address to the third of the M words. Again, the next L clock bits at input 44c cause the L sequential bits of the next code word to be provided to all channel transmit delay means 40, where individual delay takes place, so that all transducers are pulsed to transmit a beam which is dynamically focused in the zone established by the count in counter means 46. This process continues until, memory means output 44e is pulsed at the end of the next-to-last (M-1)-st code word, and counter means 46 advances to the highest I=M count. Responsive thereto, the next L clock pulses at input 44c provide the last zone code to the channel transmit delay means 40, and responsive thereto, the vibratory energy beam is focused at the minimum range $R_m$. At the end of the L bits of the M-th code word, auxiliary output 44e is again pulsed, and this pulse, when received at bidirectional register means clock C input 46a, attempts to increase the count at output 46b; however, register means 46 is so designed so that the receipt of a up-count clock pulse with a maximum count already present at output 46b causes the data at that output to remain, while an overflow OVR output 46e is pulsed, to set the flip-flop means 48 output Q at a logic one level.

The reception procedure now starts, in a second half of the sequence for each beam angle $\theta$, with reflected energy from the closest zone, at minimum range $R_m$, being received and correlated with the last (M-th) code word. The logic one level at the flip-flop means Q output 48b appears at the direction-setting D input 46d of the bidirectional register means and sets the direction control for downward counting. Simultaneously, the zone-select-data from outputs 46b appear at reference memory inputs 62a, to select (in decreasing zone order) the proper one of the M zonal reference codes stored therein; this code will be sequentially read, responsive to a clock signal at an input 62b, and provide code data at output 62c, to the correlation means code input 60d. Thus, the R bits of the M-th reference code word are serially sent from reference memory means 62 and appear at the correlation code input 60d of means 60. During the first reception time interval 22h (FIG. 2a) the signal returned from the nearest zone is digitized and processed, with channel delay means 58 using the range R data provided at counter means output 48b, to provide in-phase and quadrature-phase coherent sum signals at respective correlation means input 60a and 60b. These input signals are correlated with the M-th zone code at input 60d, utilizing the baseband clock signal at input 60c, and only a correlated pair of quadrature signals, such as pulse 24 in FIG. 2b, appear at the $R_xP$ signal outputs 60e, for that zone.

Responsive to the last bit of the M-th word being sent, the code memory means auxiliary output 44e is again pulsed, causing register means 46 to count, now in a downward direction, and decrease data at output 46b by a count of one. The new zone number/range R is now (M-1) and is supplied to all of the time-delay means 58 in each received channel, for focusing the received beam at the next-furthest range R. The new zone number information is supplied to reference memory means input 62a; responsive to the next R clock bits at input 62b, and the new zone (e.g. second zone (M-1)) data, a new reference code word is serially provided to correlation means 60, for correlation with the coherently-summed pair of quadrature digital signals as received and processed. The correlated output for this next zone is provided at output 60e. This process continues, with the count in register means 46 being decreased by one, after each new reference word has been sent from memory means 62 for correlation in means 60 with the data received at a new reception beam focal range. Eventually, the register means 46 count is reduced to the lowest count, representative of the longest range $R_1$, and this range information is provided to all channel delay means 58. Responsive to another L clock bits at input 44c, another repetition of the first (I=1) reference word is sent to the correlation means, for correlation with the data received during the last reception time interval 22a (FIG. 2a). At the end of this last reception code word, auxiliary output 44e is again pulsed; the register means output 46b is already at its lowest count, so that an underflow (UNDR) output 46f of the memory means is energized to provide a cessation STOP signal, for use as required (e.g. to temporarily halt the clock pulses to input 44c, and the like uses) at the end of a full dynamically-focused transmit and receive sequence at one angle $\theta$. The system now is able to send data for a next beam angle $\theta$, and, once the channels are all reconfigured for that angle, a new commencement START signal can restart the whole dynamically-focused zonal transmit/zonal reception process. In the meantime, the correlated output data signals can be further processed, stored and/or displayed, as required in the system.

In a typical system, each of the M=8 code words is provided with L=512 bits, e.g. as 32 hex (16-bit) digital data words, with the pulse code memory being driven by a 40 MHz. clock (provided by selecting a proper one of four phases, generated by a four-stage Johnson counter, from a 160 MHz. master system clock). Insonification with an ultrasound signal at 5 MHz. is utilized, with a similar 5 MHz. baseband clock frequency. In the example, a transducer of 64 channels is used. Thus, the time T for a full 512-pulse excitation code is (512 pulses/40 MHz.)=12.8 microseconds, which is within a desired 10-20 microsecond per zone time interval range. On reception, the code in memory means 62 is 128 words long (generally, 16 bits/word), and is transferred at the 5 MHz. baseband clock rate; the length of the reference code word is dependent upon the length of the excitation code word and is further determined, in part, by the ratio of baseband clock to pulse memory 44 clock, e.g. 5 MHz./40 MHz.=⅛, and in part by the reception channel decimation ratio, e.g. 4:1.

While several presently preferred embodiments of my novel invention have been described in detail herein, many modifications and variations will now become apparent to those skilled in the art. It is my intent, therefore, to be limited only by the scope of the appending claims and not by the specific details and instrumentalities presented by way of explanation herein.

What I claim is:

1. A method for imaging a sample with a beam of vibratory energy from an array of a plurality N of transducers, comprising the steps of:

(a) exciting the N transducers of the array with successive ones of a plurality M of coded excitation signal sets, each set being provided in a different one of a like number M of successive excitation time intervals and each different set having signals with a different one of a like plurality M of codes;

(b) focusing an excitation beam, produced by the array, into the sample at successively smaller distances $R_i$, where $1 \leq i \leq M$, along a selected ray path from the array during each successive i-th one of the M excitation time intervals;

(c) then focusing a reception beam produced by the array along the ray path and at a successively greater distance $R_{M-i}$ from a minimum distance, away from the array during each successive i-th one of a like plurality M of reception time intervals;

(d) receiving during each reception time interval, return responsive signals reflected from the sample;

(e) processing the received signals from each array transducer in a separate channel;

(f) coherently summing all of the channel processed signals; and (g) correlating the summed signals with a set of reference signals derived from the coded signals of the set used for the associated i-th excitation time interval, to recover a response signal substantially only from a volume of the sample at that distance $R_i$ associated with that i-th time interval.

2. The method of claim 1, wherein step (a) includes the step of establishing each coded signal set as a serial multi-bit binary pattern.

3. The method of claim 2, wherein step (g) includes the step of deriving the reference signal set for the i-th reception time interval from the excitation coded signal set used in the (M+1-i)-st excitation time interval.

4. The method of claim 3, wherein step (g) further includes the step of establishing each reference signal set as a serial multi-bit binary pattern of length different from the length of coded signal set pattern.

5. The method of claim 2, wherein step (a) further includes the step of setting the patterns to be substantially orthogonal to one another.

6. The method of claim 1, wherein at least one of steps (b) and (c) includes the step of focusing at least one of the transmission beam and the reception beam by time-delay beam formation procedures.

7. The method of claim 1, wherein step (a) includes the step of utilizing a different excitation coded signal set for each of the N different transducers.

8. The method of claim 1, wherein step (a) includes the step of utilizing a common excitation coded signal set for all N transducers.

9. The method of claim 1, wherein steps (b) and (c) include the step of changing the distances R in substantially linear increments.

10. The method of claim 1, wherein step (d) includes the step of delaying reception for a delay time interval equal to at least one excitation time interval, after completion of all M excitations of steps (a) and (b).

11. The method of claim 10, wherein the delaying step is accomplished by providing in front of the transducer a delay medium introducing the required delay time interval.

12. The method of claim 1, wherein steps (a)–(g) are repeated for each of a plurality of beams, each at a different angle $\theta$ with respect to a normal at a reference portion of the array.

13. Apparatus for imaging a sample with a beam of vibratory energy, comprising:

an array of a plurality N of transducers;

means for exciting the array with successive ones of a plurality M of coded excitation signal sets, each set being provided in a different one of a like number M of successive excitation time intervals and each different set having signals with a different one of a like plurality M of codes, to cause an excitation beam, produced by the array, to be focused into the sample at successively smaller distances $R_i$, where $1 \leq i \leq M$, along a selected ray path from the array during each successive i-th one of the M excitation time intervals;

means for focusing a reception beam produced by the array along the ray path and at a successively greater distance $R_{M-i}$ from a minimum distance, away from the array during each successive i-th one of a like plurality M of reception time intervals, to cause a return response signal, reflected from the sample, to be received during each reception time interval;

means for processing the received signals from each array transducer in a separate channel;

means for coherently summing all of the channel processed signals; and means for correlating the summed signals with a set of reference signals derived from the coded signals of the set used for the associated i-th excitation time interval, to recover a response signal substantially only from a volume of the sample at that distance $R_i$ associated with that i-th time interval.

14. The apparatus of claim 13, wherein said exciting means includes pulse code memory means for storing the plurality M of coded excitation signal sets and for providing each set responsive to an input request therefor.

15. The apparatus of claim 14, wherein said exciting means further includes a bidirectional counter means for providing a data output providing the set selection request input to said pulse code memory means and changing in a direction selected responsive to a signal having opposite states during the excitation and reception time intervals.

16. The apparatus of claim 14, wherein a separate pulse code memory means provides coded excitation signals sets to each associated transducer.

17. The apparatus of claim 16, further comprising excitation time delay means for independently delaying the signals from the pulse code memory means for the associated transducer, to cause the excitation beam to be focused.

18. The apparatus of claim 17, further comprising reception time delay means for independently delaying the received signals from the associated transducer, to cause the reception beam to be focused.

19. The apparatus of claim 13, wherein said correlating means includes reference memory means for storing, and providing during reception time intervals, reference signal sets derived for the i-th reception time interval from the excitation coded signal set used in the (M+1-i)-st excitation time interval.

20. The apparatus of claim 19, wherein the processing means converts each received signal to baseband, and each reference signal set stored in said reference memory means is of a length different from the length of coded signal set pattern used for excitation.

* * * * *